(12) United States Patent
Koike et al.

(10) Patent No.: US 10,507,612 B2
(45) Date of Patent: Dec. 17, 2019

(54) MARKED COMPOSITE MATERIAL AND METHOD FOR PRODUCING THE SAME

(71) Applicant: Teijin Limited, Osaka-Shi, Osaka (JP)

(72) Inventors: Shuji Koike, Osaka (JP); Takashi Goto, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 162 days.

(21) Appl. No.: 15/260,459

(22) Filed: Sep. 9, 2016

(65) Prior Publication Data

US 2017/0028614 A1   Feb. 2, 2017

Related U.S. Application Data

(63) Continuation-in-part of application No. PCT/JP2015/054830, filed on Feb. 20, 2015.

(30) Foreign Application Priority Data

Mar. 11, 2014 (JP) ................. 2014-047713

(51) Int. Cl.
| | |
|---|---|
| B29C 59/16 | (2006.01) |
| C08K 3/04 | (2006.01) |
| C08J 5/04 | (2006.01) |
| C08J 5/10 | (2006.01) |
| B29K 105/00 | (2006.01) |
| B29K 105/12 | (2006.01) |
| B29K 307/04 | (2006.01) |

(52) U.S. Cl.
CPC ............ B29C 59/16 (2013.01); C08J 5/042 (2013.01); C08J 5/10 (2013.01); C08K 3/04 (2013.01); *B29K 2105/0032* (2013.01); *B29K 2105/12* (2013.01); *B29K 2307/04* (2013.01); *C08J 2369/00* (2013.01); *C08J 2377/02* (2013.01)

(58) Field of Classification Search
CPC ............ B29C 2035/0838; B29C 65/16; B29C 35/0805; B29C 59/16; B29K 2105/06; B29K 2105/12; C08J 5/042; C08K 2201/004
USPC ...................................... 264/482
See application file for complete search history.

(56) References Cited

U.S. PATENT DOCUMENTS

| | | | | |
|---|---|---|---|---|
| 4,332,767 A | * | 6/1982 | Kitanaka ............... | B29C 43/006 264/319 |
| 2002/0088780 A1 | * | 7/2002 | Boyle .................... | B23K 26/40 219/121.69 |
| 2008/0152859 A1 | * | 6/2008 | Nagai ...................... | B41M 5/24 428/76 |
| 2015/0259518 A1 | * | 9/2015 | Gelissen ............. | C09B 67/0097 252/582 |
| 2016/0001510 A1 | * | 1/2016 | Ono ........................ | B29C 43/18 264/511 |

FOREIGN PATENT DOCUMENTS

| | | | |
|---|---|---|---|
| JP | 2001-294758 A | | 10/2001 |
| JP | 2002-146201 A | | 5/2002 |
| JP | 2006-241254 A | | 9/2006 |
| JP | 2006241254 A | * | 9/2006 |
| JP | 2006-291196 A | | 10/2006 |
| JP | 2008-013599 A | | 1/2008 |
| JP | 2009-019148 A | | 1/2009 |
| JP | 2009-166419 A | | 7/2009 |
| JP | 2010-247206 A | | 11/2010 |
| JP | 2011-032320 A | | 2/2011 |

OTHER PUBLICATIONS

Machine translation JP-2006241254, Sep. 2006.*
"Laser Marking: How to Choose the Best Laser for Your Marking Application" by Dennis Kaminski , Apr. 2011, accessed on Sep. 8, 2018 at https://www.laserfocusworld.com/articles/2011/04/laser-marking-how-to-choose-the-best-laser-for-your-marking-application.html.*
"Smart Additives Enhance Plastics Laser Marking" by Scott Sabreen, in Industrial Laser Solutions, Jan./Feb. 2012.*
May 26, 2015—(WO/PCT/JP) International Preliminary Report on Patentability—2015054830—Eng Tran.
May 26, 2015—International Search Report—Intl App PCT/JP2015/054830.

* cited by examiner

*Primary Examiner* — Philip C Tucker
*Assistant Examiner* — Jimmy R Smith, Jr.
(74) *Attorney, Agent, or Firm* — Banner & Witcoff, Ltd.

(57) ABSTRACT

Disclosed is a composite material including a black pigment, carbon fibers, and a resin, wherein marking is applied with a laser having a wavelength of 100 to 2,000 nm on the composite material having 1) an area proportion of the carbon fibers in its topmost surface layer of 10 to 90%, 2) a proportion of the black pigment contained in the composite material of 0.2 to 20% by mass, and 3) an average fiber length of the carbon fibers of 1 mm or more.

17 Claims, 4 Drawing Sheets

MARKED COMPOSITE MATERIAL AND METHOD FOR PRODUCING THE SAME

This application is a continuation-in-part of International Application No. PCT/JP2015/054830 filed on Feb. 20, 2015, which claims priority under 35 U.S.C. § 119 from Japanese Patent Application No. 2014-047713 filed on Mar. 11, 2014. The entire disclosures of the above-mentioned applications are incorporated herein by reference.

TECHNICAL FIELD

The present invention relates to a composite material, a surface of which is marked, having a high content proportion of carbon fibers in a topmost surface layer thereof, and to a method for producing the same.

BACKGROUND ART

On marking a letter or a symbol on a surface of a resin molded article, a composite material, or the like, there have hitherto been adopted spraying of inks by an inkjet system, screen printing, ink writing system, and so on. However, these methods involved problems, such as peeling of an ink surface, discoloration of inks, wear of an ink surface, etc. In order to solve these problems, in recent years, laser marking that is of a non-contact type and which has a fast marking speed and is easy in automatization and process management is adopted.

For example, PTL 1 describes a resin composition for laser processing comprising 100 parts by mass of a resin and 0.001 parts by mass or more and 20 parts by mass or less of a carbonaceous filler having a tint strength according to JIS K6217 of 50% or less. When the foregoing resin composition for laser processing is used, the laser absorbability is excellent, and the blackening or darkening of color of a base is inhibited. Thus, by adding coloring materials of various color tones, it is possible to provide a resin composition for laser processing capable of being adjusted to a desired color tone.

PTL 2 discloses a resin composition having excellent laser marking properties on a tag material in which resilience and soft feeling are required.

PTL 3 discloses a laser-markable thermoplastic resin composition which has conductivity and impact resistance and is excellent in color developability.

PTL 4 describes a polyamide-based conductive resin composition which is excellent in impact resistance and moldability and has good printing properties on laser marking.

PTL 5 describes a resin composition which is used for an application of forming a white marked area upon irradiation with a laser light.

PTL 6 describes a laser processing method of a carbon fiber-reinforced plastic and proposes a method of processing a composite material with an ultrashort pulse laser.

CITATION LIST

Patent Literature

PTL 1: JP-A-2006-291196
PTL 2: JP-A-2009-166419
PTL 3: JP-A-2006-241254
PTL 4: JP-A-2011-32320
PTL 5: JP-A-2001-294758
PTL 6: JP-A-2010-247206

SUMMARY OF INVENTION

Technical Problem

However, if it is intended to undergo laser marking on a composite material in which carbon fibers exist in a proportion to some extent in a topmost surface layer thereof by the above-described conventional technologies, in the case where the laser energy is low, since both the carbon fibers and the resin remain without being burned off, a marked composite material cannot be obtained. Conversely, in the case where the energy is high, though both the resin and the carbon fibers can be burned off, the range where the both are burned off at the same time cannot be controlled, and the resin and the carbon fibers are burned off over a wide range, and therefore, it is difficult to obtain a composite material in which discriminable marking is applied.

According to the invention described in PTL 5, in a material containing a lot of carbon fibers in a topmost surface layer thereof, the fiber length is short, so that there was not particularly involved a problem in applying laser marking in the topmost surface layer. However, in the case where the fiber length is 1 mm or more, it becomes difficult to apply marking in the same way. Since an ultrashort pulse laser is used as the laser described in PTL 6, there is involved such a problem that in addition to extreme expensiveness, it is difficult to perform processing at a high speed. Thus, the method described in PTL 6 was poor in practicability.

An object of the present invention is to provide a marking method capable of applying marking with a high recognition rate even on a composite material in which carbon fibers exist in a proportion to some extent in a topmost surface layer thereof and a marked composite material having excellent printability.

Solution to Problem

The present inventors made extensive and intensive investigations. As a result, it has been found that the foregoing problem can be solved by the following means, resulting in attaining the present invention.

<1> A method of applying laser marking on a composite material comprising a black pigment, carbon fibers, and a resin, and having the following 1) to 3):

1) an area proportion of the carbon fibers in its topmost surface layer of 10 to 90%,
2) a proportion of the black pigment contained in the composite material of 0.2 to 20% by mass, and
3) an average fiber length of the carbon fibers of 1 mm or more and 100 mm or less, wherein the laser marking is applied using a laser having a wavelength of 100 to 2,000 nm, an output density of 0.1 (mW/μm$^2$) or more, and an irradiation energy per pulse of 90,000 (×10$^5$ mWs) or less.

<2> The method of applying laser marking according to the above item <1>, wherein the wavelength is 200 to 830 nm.

<3> The method of applying laser marking according to the above item <1>, wherein the area proportion of the carbon fibers in the topmost surface layer is 20 to 60%.

<4> The method of applying laser marking according to the above item <1>, wherein the resin contained in the composite material is a thermoplastic resin.

<5> The method of applying laser marking according to the above item <1>, wherein a volume fraction (Vf) of the carbon fibers contained in the composite material is 10 to 65%.

<6> The method of applying laser marking according to the above item <1>, wherein the black pigment is carbon black.
<7> The method of applying laser marking according to the above item <1>, wherein the laser is a YVO$_4$ laser.
<8> A method of producing a composite material having laser marking applied thereon by using the method of applying laser marking set forth in the above item <1>.
<9> The method of producing a composite material according to the above item <8>, wherein the wavelength is 200 to 830 nm.
<10> The method of producing a composite material according to the above item <8>, wherein the area proportion of the carbon fibers in the topmost surface layer is 20 to 60%.
<11> The method of producing a composite material according to the above item <8>, wherein the resin contained in the composite material is a thermoplastic resin.
<12> The method of producing a composite material according to the above item <8>, wherein a volume fraction (Vf) of the carbon fibers contained in the composite material is 10 to 65%.
<13> The method of producing a composite material according to the above item <8>, wherein the black pigment is carbon black.
<14> The method of producing a composite material according to the above item <8>, wherein the laser is a YVO$_4$ laser.

The present invention relates to the above items (1) to (14), but the following items 1. to 6. are also described.

1. A composite material including a black pigment, carbon fibers, and a resin, wherein marking is applied with a laser having a wavelength of 100 to 2,000 nm on the composite material having
   1) an area proportion of the carbon fibers in its topmost surface layer of 10 to 90%,
   2) a proportion of the black pigment contained in the composite material of 0.2 to 20% by mass, and
   3) an average fiber length of the carbon fibers of 1 mm or more.
2. The composite material as set forth in the above item 1, wherein the wavelength is 200 to 830 nm.
3. The composite material as set forth in any of the above item 1 or 2, wherein the average fiber length of the carbon fibers is 100 mm or less.
4. The composite material as set forth in any one of the above items 1 to 3, wherein the resin contained in the composite material is a thermoplastic resin.
5. The composite material as set forth in any one of the above items 1 to 4, wherein a volume fraction (Vf) of the carbon fibers contained in the composite material is 10 to 65%.
6. The composite material as set forth in any one of the above items 1 to 5, wherein the black pigment is carbon black.

Advantageous Effects of Invention

The marked composite material of the present invention, in which carbon fibers exist in a proportion to some extent in a topmost surface layer thereof, is extremely high in a recognition rate of a marked letter and so on. In addition, since the marked composite material of the present invention is excellent in light fastness of a marked region, a stable printed letter or symbol can be clearly maintained, and discrimination, management, and utilization of products can be performed over a long period of time.

DESCRIPTION OF EMBODIMENTS

Embodiments of the present invention are hereunder described successively, but it should not be construed that the present invention is limited thereto.

The marked composite material of the present invention is a composite material including a black pigment, carbon fibers, and a resin, wherein marking is applied with a laser having a wavelength of 100 to 2,000 nm on the composite material having
1) an area proportion of the carbon fibers in its topmost surface layer of 10 to 90%,
2) a proportion of the black pigment contained in the composite material of 0.2 to 20% by mass, and
3) an average fiber length of the carbon fibers of 1 mm or more.

[Components of Composite Material]

The composite material of the present invention is a composite material including a black pigment, carbon fibers, and a resin, wherein an area proportion of the carbon fibers in its topmost surface layer is 10 to 90%.

The topmost surface layer refers to a range of 10 μm of a surface layer of the composite material from the surface toward the inside direction. In other words, the topmost surface refers to a volume part of the composite material surrounded by (i) the surface of the composite material and (ii) the thickness length advanced 10 μm in the vertical direction to the surface.

Though the measurement method of the topmost surface is described later, even in not only a composite material having a surface of a tabular shape but also a composite material having a surface of a complicated shape, so long as laser marking is applicable, the topmost surface can be defined according to the above-described definition.

As for the area proportion of the carbon fibers in the topmost surface layer as referred to in the present invention, so long as even a part of the carbon fibers exists within a range of 10 μm from the surface of the composite material, such is defined as an area of the carbon fibers.

The area proportion of the carbon fibers in the topmost surface layer can be expressed from an area of the carbon fibers and a whole area of the measurement range according to the following formula.

$$\text{Area proportion of carbon fibers in topmost surface layer} = [(\text{Area of carbon fibers})/(\text{Whole area of measurement range})] \times 100(\%) \qquad (2)$$

When the area proportion of the carbon fibers in the topmost surface layer of the composite material is less than 10%, the mechanical strength as the carbon fiber composite material cannot be exhibited. Conversely, when it is more than 90%, since the carbon fibers in the surface portion excessively exist, the resin whose surface is to be burned away does not exist, so that even when marking is applied, it cannot be recognized. The area proportion of the carbon fibers in the topmost surface layer is preferably 20 to 60%, more preferably 25 to 55%, and still more preferably 45 to 55%.

[Marked Composite Material]

Figure 1:
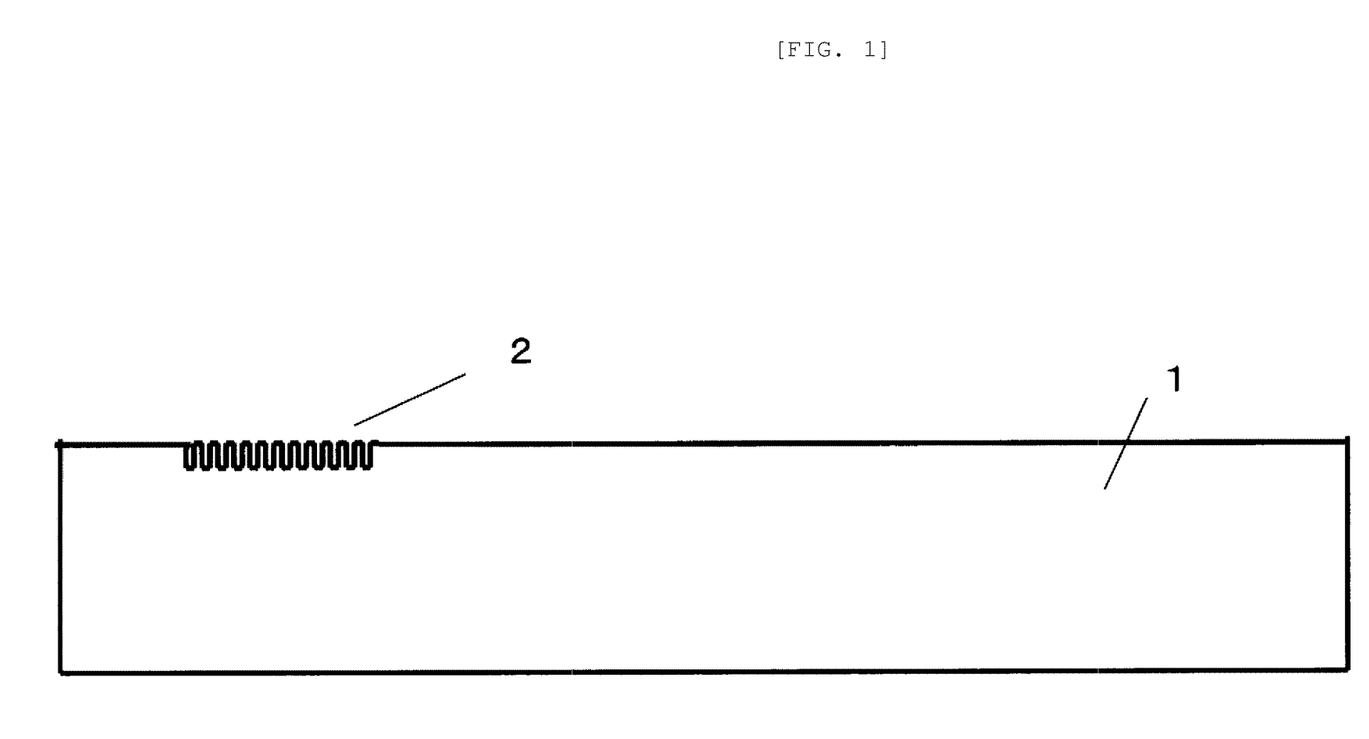
FIG. 1 is a diagrammatic view in which a part of a composite material is marked.
Figure 2:
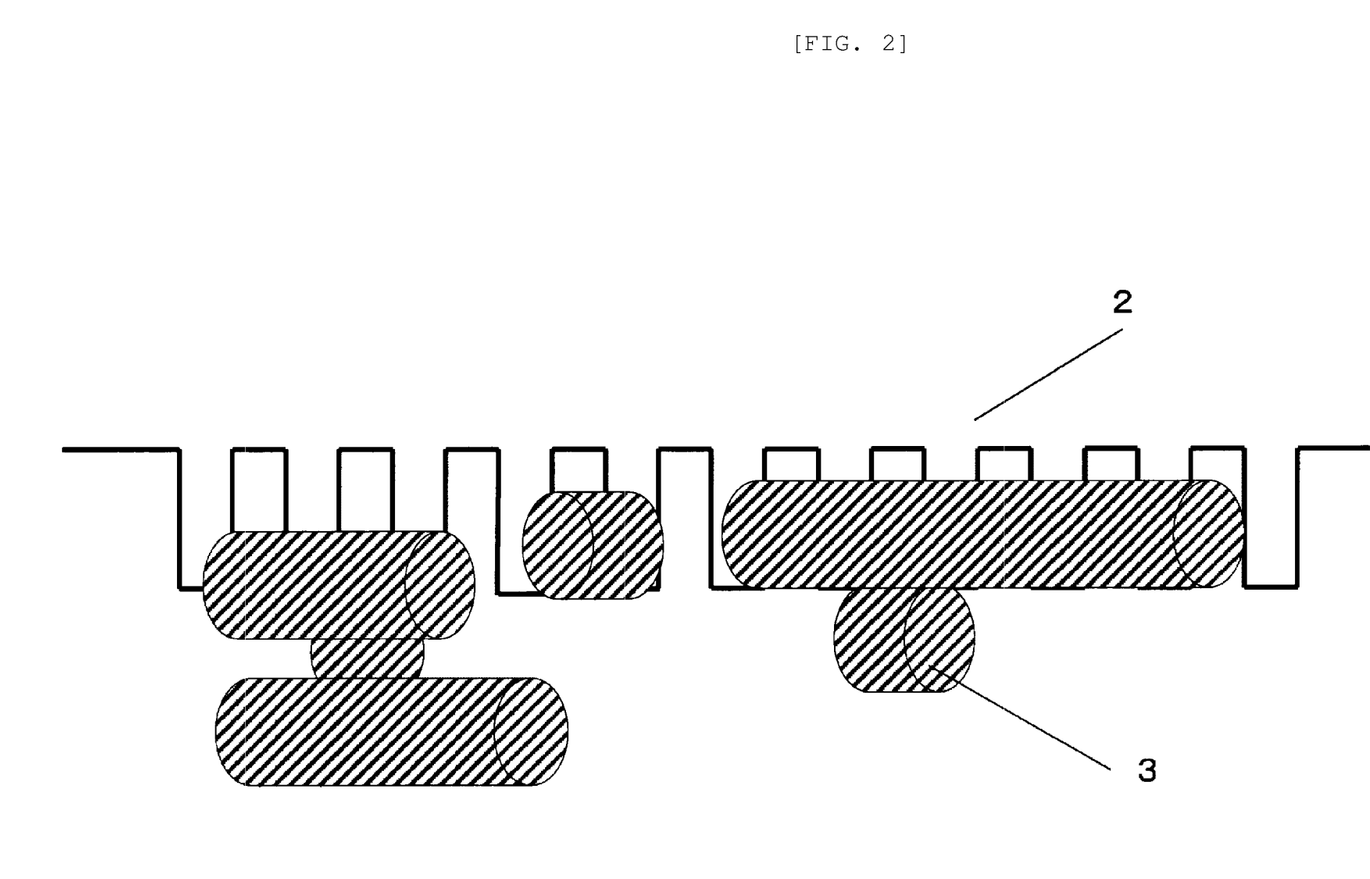
FIG. 2 is a diagrammatic view showing a state of formation of minute irregularities in a topmost surface layer of a marked composite material.

The marked composite material of the present invention has a minute recess as illustrated in FIGS. 1 and 2. As shown in FIG. 2, the resin is burned off in a marked place, whereby the recess is formed, whereas the carbon fibers existing in the topmost surface layer remain without being burned off.

The marked place refers to a region where the recess having a minute structure exists in the surface of the composite material as shown by a symbol 2 in FIG. 1. The minute structure is able to reveal a structural color due to an optical phenomenon, such as diffraction and interference, etc. That is, a figure or a letter is drawn at the marked place by appropriately disposing a region where a site revealing a structural color and/or a diffracted light is uniformly formed, or a site revealing a structural color and/or a diffracted light.

[Carbon Fibers]

As the carbon fibers, there are in general known polyacrylonitrile (PAN)-based carbon fibers, petroleum or coal pitch-based carbon fibers, rayon-based carbon fibers, cellulose-based carbon fibers, lignin-based carbon fibers, phenol-based carbon fibers, vapor phase deposition carbon fibers, and the like. In the present invention, all of these carbon fibers may be suitably used.

Among those, in the present invention, polyacrylonitrile (PAN)-based carbon fibers are preferably used from the standpoint of excellent tensile strength. In the case of using PAN-based carbon fibers as the carbon fibers, a tensile modulus of elasticity thereof is preferably in the range of from 100 GPa to 600 GPa, more preferably in the range of from 200 GPa to 500 GPa, and still more preferably in the range of from 230 to 450 GPa. In addition, the tensile strength is preferably in the range of from 2,000 MPa to 10,000 MPa, and more preferably in the range of from 3,000 MPa to 8,000 MPa.

The carbon fibers which are used in the present invention may be one having a sizing agent attached to a surface thereof. In the case of using carbon fibers having a sizing agent attached thereto, the kind of the sizing agent may be properly selected depending upon the kinds of carbon fiber and matrix resin and is not particularly limited.

[Form of Carbon Fibers]

The form of the fibers in the present invention is not particularly limited and may be a textile composed of continuous fibers or a unidirectional material in which carbon fibers are disposed in one direction.

In addition, in the case where the state of the carbon fibers is a discontinuous fiber, those in which discontinuous carbon fibers are disposed in such a manner that they are randomly disposed and overlaid on a plane may be adopted. In this case, the carbon fibers may exist in the composite material in a state of carbon fiber bundle or in a state where a carbon fiber bundle and a single yarn coexist, or the carbon fibers may exist in a state of single yarn where the carbon fibers are fully opened.

Furthermore, a composite material prepared by molding carbon fiber pellets, namely pellets obtained through a step of adjusting a molten thermoplastic resin to a predetermined viscosity and impregnating it in carbon fibers that are a continuous fiber, followed by cutting, in a prescribed shape, such as a sheet shape, etc., by using an injecting molding machine, may be used.

[Average Fiber Length of Carbon Fibers]

As for an average fiber length of the carbon fibers, in the case of using the carbon fibers having been cut in a fixed length by a rotary cutter or the like, a cut length thereof is corresponding to the average fiber length, and this is also a number average fiber length and further a weight average fiber length.

When a fiber length of the individual carbon fiber is defined as $Li$, and a number of the measured fibers is defined as $j$, a number average fiber length ($Ln$) and a weight average fiber length ($Lw$) are determined according to the following formulae (3) and (4) (in the case of a fixed cut length, the weight average fiber length ($Lw$) will be calculated by the calculation formula (3) of the number average fiber length ($Ln$)).

$$Ln = \Sigma Li/j \quad (3)$$

$$Lw = (\Sigma Li^2)/(\Sigma Li) \quad (4)$$

The average fiber length in the present invention may be measured for either the number average fiber length or the weight average fiber length.

The average fiber length of the carbon fibers which are used in the present invention is 1 mm or more. So long as the average fiber length of the carbon fibers is 1 mm or less, even when energy is irradiated, the heat hardly conducts, and only a specified limited region is burned off, and hence, a problem that the resin is melted over a wide range exceeding the desired range is not caused, and it is easy to apply laser marking.

An upper limit of the fiber length of the carbon fibers which are used in the present invention may be properly determined depending upon the kind of carbon fibers or the kind of resin, an orientation state of the carbon fibers in the composite material, and the like, and it is not particularly limited. Inconsequence, in the present invention, continuous fibers may be used, and discontinuous fibers may also be used, depending upon the purpose.

However, in the case of using continuous fibers, when the continuous fibers come out in the topmost surface layer, the continuous fibers are concentrated in a specified range, so that there may be the case where a portion where the marking cannot be applied appears. In consequence, the marking in the present invention is preferably applied to the composite material using discontinuous fibers. In consequence, the average fiber length of the carbon fibers is preferably 100 mm or less. More specifically, the average fiber length is more preferably 3 mm to 100 mm, still more preferably 5 mm to 80 mm, and yet still more preferably 7 to 50 mm.

[Resin]

The resin which is contained in the composite material may be either a thermosetting resin or a thermoplastic resin. In the case where the resin which is contained in the composite material is a thermosetting resin, examples of the resin may include an epoxy resin, an epoxy ester resin, an unsaturated polyester resin (e.g., a vinyl ester resin), a diallyl terephthalate resin, a phenol resin, a bismaleimide resin, a maleimide resin, a bismaleimide/triazine resin, a triazine resin, a cyanate resin, a cyanate ester resin, a benzoxazine resin, a dicyclopentadiene resin, a urea resin, a melamine resin, a thermosetting polyimide resin, and the like. Among those, an epoxy resin may be suitably used as the thermosetting resin in the present invention. This is because the epoxy resin is excellent in mechanical strength after curing.

Examples of the epoxy resin may include a bisphenol A type epoxy resin, a bisphenol F type epoxy resin, a resorcinol type epoxy resin, a phenol novolak type epoxy resin, a cresol novolak type epoxy resin, a polyethylene glycol type epoxy resin, a polypropylene glycol type epoxy resin, a dicyclopentadiene type epoxy resin, a bisphenol AD type epoxy resin, a bisphenyl type epoxy resin, a naphthalene type epoxy resin, an alicyclic epoxy resin, a glycidyl ester-based resin, a glycidylamine-based resin, a heterocyclic epoxy resin, a diarylsulfone type epoxy resin, a hydroquinone type epoxy resin, an oxazoline ring-containing epoxy resin, and modified products thereof, and the like. The thermosetting resin which is used in the present invention may be only a single kind or two or more kinds.

In the case where the resin which is contained in the composite material is a thermoplastic resin, examples thereof include a polyamide, polycarbonate, polyoxymethylene, polyphenylene sulfide, polyphenylene ether, a modified polyphenylene ether, polyetheretherketone, polyetherimide, polyamide-imide, polyethylene terephthalate, polybutylene terephthalate, polyethylene naphthalate, polyethylene, polypropylene, polystyrene, polymethyl methacrylate, an AS resin, and an ABS resin. In particular, in view of balancing costs and physical properties, at least one selected from the group consisting of a polyamide, polypropylene, polycarbonate, and polyphenylene sulfide is preferred. In addition, as the polyamide (hereinafter sometimes abbreviated as PA and also called nylon), at least one selected from the group consisting of PA6 (also called polycaproamide or polycaprolactam, and more precisely poly-ε-caprolactam), PA26 (polyethylene adipamide), PA46 (polytetramethylene adipamide), PA66 (polyhexamethylene adipamide), PA69 (polyhexamethylene azepamide), PA610 (polyhexamethylene sebacamide), PA611 (polyhexamethylene undecamide), PA612 (polyhexamethylene dodecamide), PA11 (polyundecanamide), PA12 (polydodecanamide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide), PA12T (polydodecamethylene terephthalamide), PA12I (polydodecamethylene isophthalamide), and polyamide MXD6 (polymetaxylene adipamide) is preferred.

As for the laser marking in the present invention, in comparison with the thermosetting resin, the thermoplastic resin is able to more likely solve the problems by using the constitution of the present invention. That is, since the thermoplastic resin is low in rigidity and low in a melting point or a glass transition point relative to a sublimation point as compared with the thermosetting resin, on applying laser marking, the surroundings of the sublimated thermoplastic resin become in a molten state. For that reason, even if an irregular portion was once provided by means of laser marking, the irregularities for revealing a structural color were liable to be flattened, and it was difficult to achieve marking.

[Volume Fraction (Vf) of Carbon Fibers]

With respect to the carbon fibers and the resin which are contained in the composite material of the present invention, though a volume fraction (Vf) of the carbon fibers as defined according to the following formula (1) is not particularly limited, it is preferably 10 to 65%, more preferably 20 to 50%, and still more preferably 30 to 40%.

$$Vf=100\times(\text{Carbon fiber volume})/[(\text{Carbon fiber volume})+(\text{Resin volume})] \quad (1)$$

When the Vf of the composite material is 10% or more, the reinforcing effect is liable to be thoroughly revealed. Conversely, when the Vf is 65% or less, voids are hardly formed in the resulting composite material, and the physical properties of the composite material are liable to be enhanced.

[Black Pigment]

The composite material of the present invention contains a black pigment in a proportion of 0.2 to 20% by mass. As the black pigment which is used in the present invention, at least one black pigment selected from the group consisting of carbon black, titanium black, furnace black, acetylene black, lamp black, aniline black, sulfur black, and the like is preferred. In particular, a black pigment composed of carbon particles, for example, carbon black, is most preferred.

Even in the case of using triiron tetraoxide as described in JP-A-2001-294758, the object of the present invention can be achieved. However, since the carbon black does not have a melting point under atmospheric pressure but sublimates or remains in a solid state, irregularities are liable to be formed on the marked surface. Meanwhile, since the triiron tetraoxide has a melting point, even if an irregular portion is once provided by means of laser marking, the irregularities for revealing a structural color are liable to be flattened, and it is difficult to achieve marking. In consequence, carbon black is more preferred as the black pigment.

(Mass Proportion of Black Pigment)

A proportion of the black pigment which the composite material of the present invention contains is in the range of from 0.2 to 20% by mass, preferably from 0.3 to 10% by mass, more preferably from 0.3 to 2% by mass, and especially preferably from 0.6 to 2% by mass. What the proportion of the black pigment is less than 0.2% by mass is not preferred because a problem that a structural color is hardly revealed on the surface of the composite material after marking is caused. In addition, in the case where the addition amount of the black pigment is too low, there is a tendency that colorability and concealment of a resin color become deteriorated, a contrast with the marked area becomes relatively worse, and weather resistance is lowered.

Conversely, when the addition amount of the black pigment is too high, in the case of using a thermoplastic resin as the resin, there is a tendency that the resin becomes in a state of high viscosity and high thermal conductivity at the time of molding the composite material, fluidity at the time of molding is lowered, moldability becomes deteriorated, and the design range is narrowed, too.

[Carbon Black]

In the composite material of the present invention, it is preferred to use carbon black as the black pigment. The addition amount of carbon black is one as described above (mass proportion of the black pigment).

A material containing carbon black is more enhanced in recognition propriety than a material not containing this. This is because the carbon black acts as a laser light energy absorbing body. By absorbing a laser beam, the carbon black is burned and released as a gaseous decomposition product, such as $CO_2$, etc., from the composite material. According to this, a frothy melt zone where the particles of carbon black no longer exist is formed in a shape of a symbol to be applied, or the like, on the surface of the composite material. As a result, a contrast between a ground area and a printed area becomes high, whereby a composite material marked with a clear letter, symbol, or image, or the like can be suitably obtained.

(Particle Diameter of Carbon Black)

Though a particle diameter of the carbon black which is used in the present invention is not particularly limited, it is preferably 50 µm or less in terms of a secondary particle diameter. General carbon black exists in a form of aggregate, and such an aggregate is in a form in which plural primary particles are chemically/physically aggregated. The secondary particle in the present invention refers to an aggregate formed through aggregation of primary particles, and a secondary aggregate formed through aggregation of aggregates each other is also generically named the secondary particle in the present specification. The primary particle refers to a basic particle of the carbon black aggregate. The secondary particle diameter of carbon black is preferably 10 to 40 µm, and more preferably 20 to 30 µm.

[Other Agents]

So long as the object of the present invention is not impaired, the composite material of the present invention may contain additives, such as various fibrous or non-fibrous fillers of organic fibers or inorganic fibers, a flame retardant, an anti-UV agent, a pigment, a mold release agent, a softening agent, a plasticizer, or a surfactant.

[Molded Body]

There may be the case where the composite material becomes a molded body through molding, and the composite material and the molded body are interpreted different from each other. However, the composite material in the present invention is not distinguished from the molded body after molding. In consequence, the composite material in the present invention is a concept inclusive of a general molded body.

Therefore, the composite material in the present invention may be molded or can be used as a component of a molded body as it stands without passing through a molding step.

[Laser Marking]

By marking the composite material in the present invention with a laser having a wavelength of 100 to 2,000 nm, at least one selected from the consisting of a letter, a labeling, a barcode, a two-dimensional barcode known especially as QR code (registered trademark), a figure, a pattern, and the like (hereinafter generically named "marking contents") is applied.

Figure 3:
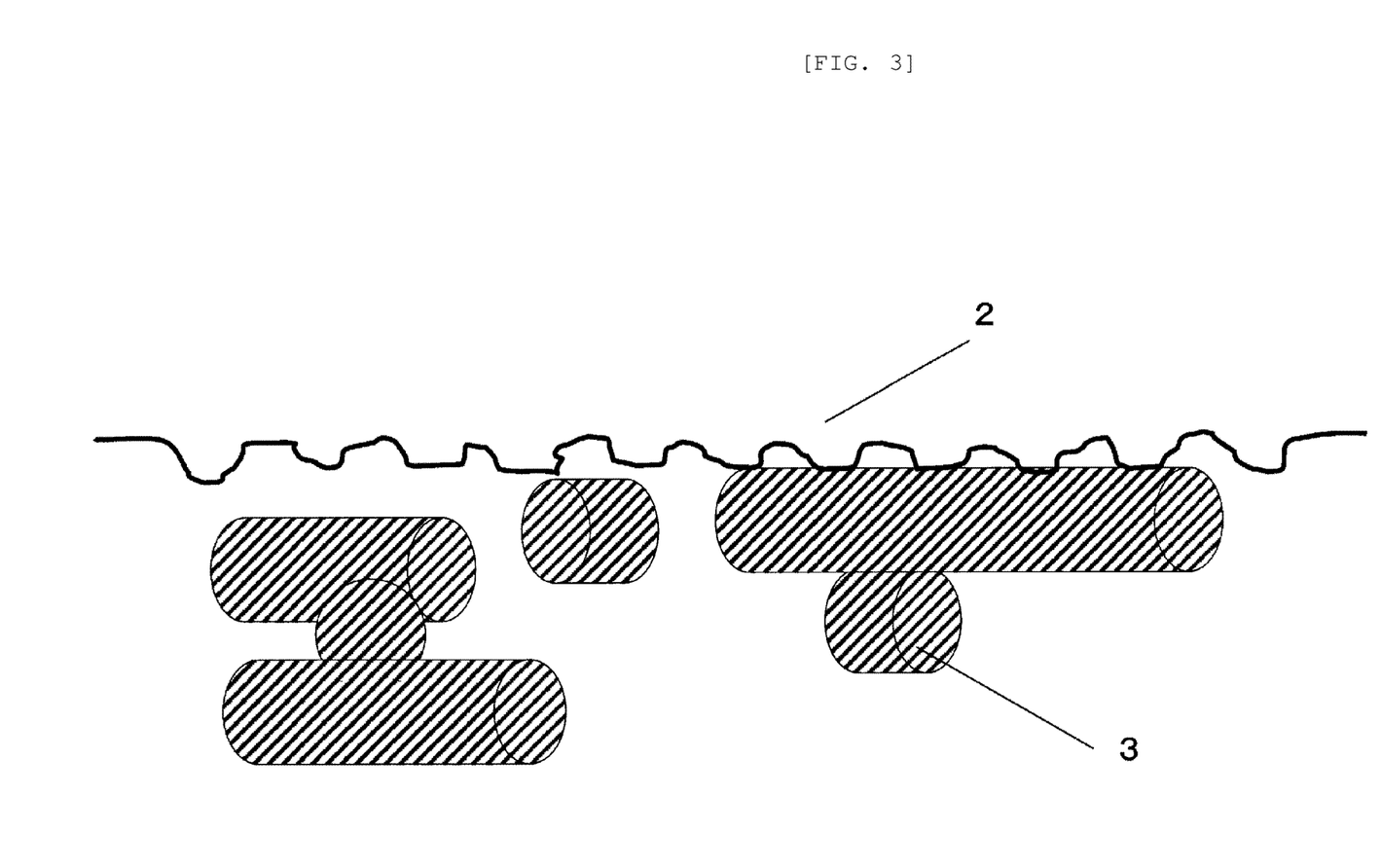
FIG. 3 is a diagrammatic view showing a state where only a matrix of a surface layer is burned off without being able to form a minute recess.

In the case of marking a composite material in which carbon fibers exist in the topmost surface layer with a conventional $CO_2$ laser (wavelength: 9,400 nm or 10,600 nm), the resin existent in the surface is slightly burned away and burned off as shown in FIG. 3; however, a recess thereof is not sufficient, and a surface recess is not formed. In addition, even when irradiated with a laser, the carbon fibers existent in the topmost surface layer of the composite material are hardly burned away and remain (FIG. 3). For that reason, even if the composite material was marked with a laser, it was difficult to read the marking contents.

In contrast, there is a method of burning away the carbon fibers by increasing the energy of laser; however, since the energy is too high, the matrix resin in the surroundings is decomposed or melted over a wide range (FIG. 4), or causes ignition or the like, so that the marking contents cannot be discriminated.

Meanwhile, when the composite material is marked with a laser having a wavelength of 100 to 2,000 nm, the recess shown in FIGS. 1 and 2 can be formed.

Though an upper limit of the wavelength of the laser is not particularly limited so long as it is 2,000 nm or less, it is preferably 1,200 nm or less, more preferably 830 nm or less, and still more preferably 600 nm or less. On the other hand, a lower limit of an oscillation wavelength of the markable laser is 100 nm, and the oscillation wavelength is preferably 200 nm or more.

Specifically, the laser is preferably a shorter wavelength $YVO_4$ laser or YAG laser, and more preferably $YVO_4$ (SHG) or $YVO_4$ (THG). In the case of $YVO_4$ (SHG) or $YVO_4$ (THG), the laser wavelength is short as 1,000 to 1,200 nm and 300 to 600 nm, respectively, and as compared with the conventional $CO_2$ laser, the marking contents with an improved recognition rate can be formed.

In the marking method in the present invention, as for the laser light energy, the laser beam may be either of a single mode or a multiple mode. In addition, though a laser beam having a wide beam diameter as 80 to 100 µm may be used, a laser beam that is of a single mode and has a beam diameter of 10 to 40 µm is more preferred because the marking with a good contrast is achieved.

EXAMPLES

The present invention is hereunder specifically described by reference to Examples, but it should be construed that the present invention is not limited thereto.

(Evaluation Methods)

(1) Area Proportion of Carbon Fibers in Topmost Surface Layer:

In a surface of a composite material, an arbitrary site where laser marking may be applied was defined as a whole area of the measurement range by extracting a region of a regular square of 10 mm in length and 10 mm in width at random. The composite material of the whole area of the measurement range was cut with a microtome such that a portion in a thickness of 10 µm from the surface was a film-like material; a transmission image was taken with a microscope (VHX-90, manufactured by Keyence Corporation) while lighting up from the bottom, to detect a transmission area of the carbon fibers; and in the case where even a part of the carbon fibers existed, the resulting area was defined as an area of the carbon fibers. The area proportion of the carbon fibers in the topmost surface layer was calculated from the area of the carbon fibers and the whole area of the measurement range according to the following formula (2).

The laser for use in the laser marking in the present invention has a wavelength of 100 to 2000 nm, an output density of 0.1 (mW/µm$^2$) or more, and an irradiation energy per pulse of 90,000 (×10$^5$ mWs) or less.

When the output density is 0.1 (mW/µm$^2$) or more, the composite material can be efficiently burned off, and when the irradiation energy per pulse is 90,000 (×10$^5$ mWs) or less, the burned off range does not greatly spread. That is, when the marking is applied by the method satisfying the laser conditions as described above, it is possible to efficiently burn off the composite material in a short time and to enhance the recognition propriety.

The output density means an energy density per unit time (second) during laser irradiation, and is generally represented by the following formula (5):

Output density (mW/µm$^2$)=[Output (W)/{(Laser pulse frequency (Hz)×(Irradiation time per pulse (second))}]/(Laser spot area (µm$^2$))　　(5)

Since laser irradiation used in laser marking is pulse oscillation, there exist both the time in which the laser is being irradiated and the time in which the laser is not being irradiated even if the laser irradiation is continuously conducted.

The actual laser irradiation time in one second is represented by "(Laser pulse frequency (Hz))×(Irradiation time per pulse (second))". For example, in a case where the laser pulse frequency (Hz) is 50,000 (Hz) and the irradiation time per pulse (second) is 0.000005 (second), a continuous laser marking for 1 second corresponds to an actual laser irradiation for 0.25 (second).

The output (W) in laser marking is a setting value of energy per unit time (second). Therefore, an energy per unit time (second) in terms of the time in which a laser is actually irradiated has to be obtained by dividing the output (W) by "(Laser pulse frequency (Hz))×(Irradiation time per pulse (second))".

Accordingly, when an output of a laser is temporarily set to 3 (W), the energy per unit time (second) in the laser irradiation is:

$$3 (w)/[(0.25 \text{ (second) of laser irradiation})/(\text{per 1 second of laser marking})]=12 (w).$$

This value is then divided by the spot area of the laser to calculate the output density ($mW/\mu m^2$).

The output density is preferably 1.0 ($mW/\mu m^2$) or more and 30 ($mW/\mu m^2$) or less, and more preferably 3.0 ($mW/\mu m^2$) or more and 20 ($mW/\mu m^2$) or less.

The irradiation energy per pulse is generally represented by the following formula (6):

$$(\text{Irradiation energy per pulse}(\times 10^5 \text{ mWs}))=\text{Output (W)}/(\text{Laser pulse frequency (Hz)}) \quad (6)$$

As described above, the output (W) in laser marking is a setting value of the irradiation energy per unit time (second).

Since laser irradiation is pulse oscillation, there exist the time in which the laser is being irradiated and the time in which the laser is not being irradiated even if the laser irradiation is continuously conducted. The laser is irradiated the number of times equal to the frequency (Hz) of the laser pulse in 1 second. Accordingly, the irradiation energy per pulse can be obtained by dividing the output of the laser by the laser pulse frequency (Hz).

For example, in a case where the output is 3 (W) and the frequency (Hz) of the laser pulse is 50,000 (Hz), the irradiation energy per pulse is 6,000 ($\times 10^5$ mWs).

The irradiation energy per pulse is preferably 1000 ($\times 10^5$ mWs) or more and 50,000 ($\times 10^5$ mWs) or less, and more preferably 1500 ($\times 10^5$ mWs) or more and 10,000 ($\times 10^5$ mWs) or less.

As a laser satisfying the output density and the irradiation energy per pulse described above, a $YVO_4$ laser is preferably used.

$$\text{Area proportion of carbon fibers in topmost surface layer}=[(\text{Area of carbon fibers})/(\text{Whole area of measurement range})]\times 100(\%) \quad (2)$$

(2) Analysis of Average Fiber Length of Carbon Fibers Contained in Composite Material:

A length of 100 carbon fibers which had been extracted at random from a composite material was measured and recorded in 1 mm units by using a vernier caliper and a magnifier, and an average fiber length (La) was determined from a length (Li) of all of measured carbon fibers according to the following formula (4). While the formula (4) is concerned with the calculation method of the weight average fiber length, values of Examples 1 to 10, Comparative Examples 1 to 7, and Reference Example 5 in which the carbon fibers were cut in a fixed length by a rotary cutter coincide with those calculated in terms of a number average fiber length (the foregoing formula (3)). In the case of a composite material, after removing the resin in a furnace at 500° C. for about 1 hour, the carbon fibers were extracted.

$$La=(\Sigma Li^2)/(\Sigma Li) \quad (4)$$

(3) Recognition Rate of Marked Region:

A recognition rate of a marked region was evaluated with a handy type scanner (BT-1000, manufactured by Keyence Corporation) or a fixed type scanner (SR-D100, manufactured by Keyence Corporation) having an excellent recognition performance according to the following 5 grades.

5: Very good

The marking is recognizable with the handy type scanner regardless of a setting condition.

4: Good

The marking is recognizable with the handy type scanner by minutely adjusting a marked region within 10° against a set optical path angle.

3: Recognizable

The marking cannot be recognized with the handy type scanner but is recognizable only when using the fixed type scanner.

2: Failure

Though it was impossible to recognize the marking with the handy type scanner, when using the fixed type scanner, there may be the case where the marking is recognized on rare occasions in a one-in-ten probability or less.

1: Failure

It was impossible to recognize the marking under any condition.

Figure 4:
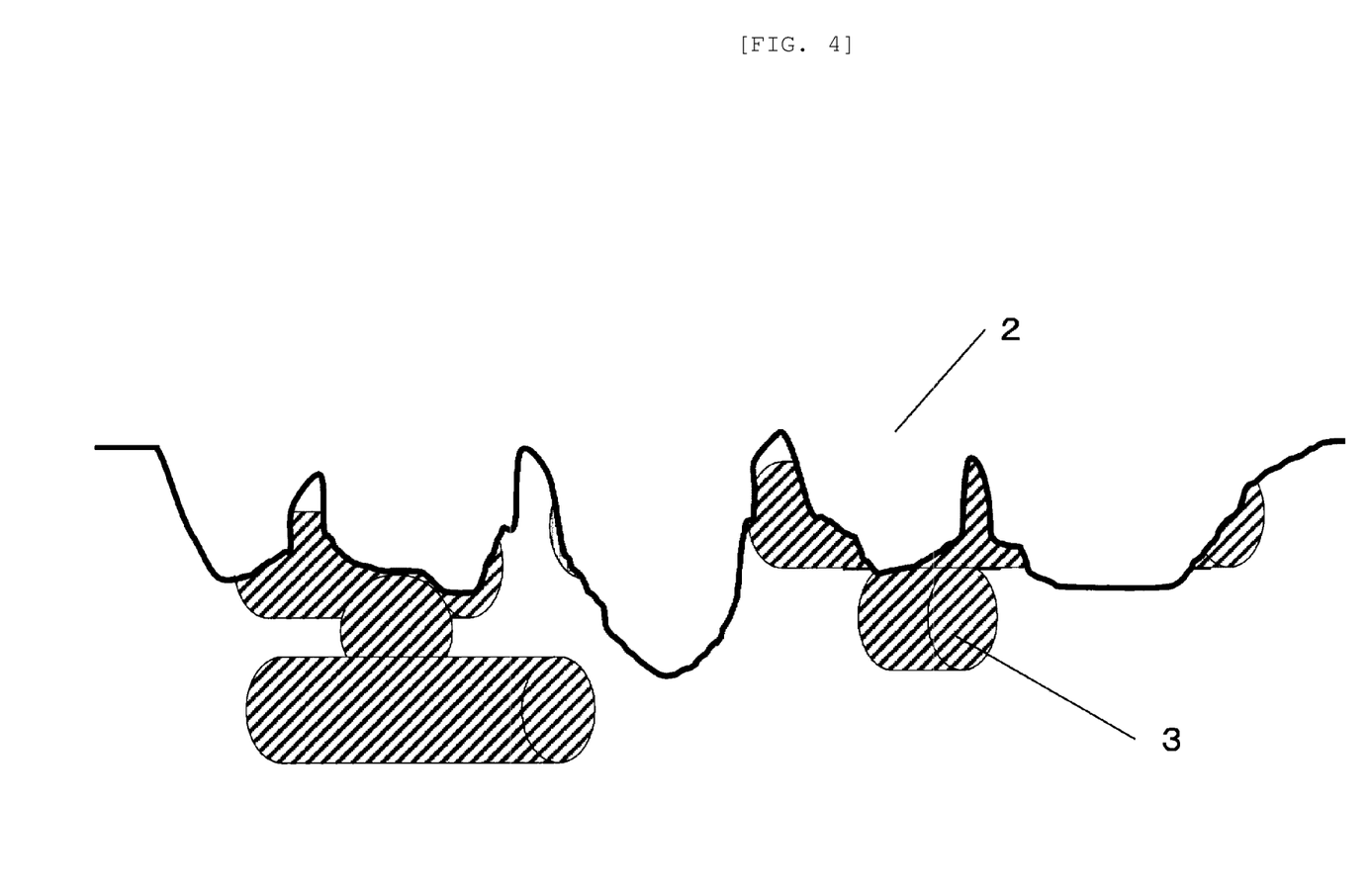
FIG. 4 is a diagrammatic view showing a molten state over a wide range without being able to form the desired marking.

(4) Surface of Composite Material after Irradiation with Laser:

(4-1) Shape of Burning-Off of Black Pigment/Resin Portion:

The range of burning-off of the resin was visually judged and evaluated on whether or not it was corresponding to any of FIGS. 2 to 4.

(4-2) Color Development of Structural Color:

The existence of a minute recess was visually confirmed on whether or not the structural color was developed. In a sample in which a structural color was clearly developed, a minute recess was beautifully revealed, whereas in a sample in which a structural color was not developed on the surface of a composite material, a minute recess was not formed.

[Composite Material 1]

Using carbon fibers, "TENAX" (registered trademark) STS40-24K5 (average fiber diameter: 7 μm), manufactured by Toho Tenax Co., Ltd., which were cut in an average fiber length of 16 mm and using a nylon 6 resin, "A1030", manufactured by Unitika Ltd., as a matrix resin, a mat having the carbon fibers randomly oriented therein and having a basis weight of the carbon fibers of 1,800 $g/m^2$ and a basis weight of the nylon resin of 1,500 $g/m^2$ was prepared on the basis of the method described in WO-A-2012/105080. At this time, carbon black as a black pigment was previously mixed in the nylon resin such that it was contained in an amount of 1.2% by mass in a composite material to be produced.

That is, a masterbatch in which carbon black (oil furnace carbon black, "BLACK PEARLS 800", manufactured by Cabot Japan K.K., average primary particle diameter: 17 nm, sulfur content: 0.5 wt %) was mixed in a nylon 6 resin ("A1030BRF-BA", manufactured by Unitika Ltd.) was prepared and used.

The production method was one as described in the above-described WO-A-2012/105080. That is, a strand having passed through a cutter was introduced into a flexible conveying pipe disposed just under a rotary cutter, and a taper tube whose diameter was enlarged downward was welded to a lower portion of the conveying pipe. Then, a support was set up in a lower portion of an outlet of the taper tube, and a mixture of the cut carbon fibers and the nylon resin was accumulated in a belt-shaped form on the support, thereby obtaining a composite material precursor having the reinforced fibers and the thermoplastic resin mixed on the support. This composite material precursor was placed in a mold heated at 260° C. and heated in a press machine at 2.0 MPa for 5 minutes, thereby obtaining a composite material having a thickness of 2.3 mm.

An average fiber length of the carbon fibers contained in the resulting composite material was 16 mm, and a volume fraction (Vf) of the carbon fibers was 43%. In addition, as a result of measurement of an area proportion of the carbon fibers in a topmost surface layer of the composite material 1, it was found to be 50%.

[Composite Material 2]

A plain weave fabric W3101 using carbon fibers, HTA-3K (manufactured by Toho Tenax Co., Ltd.) was prepared, and a nylon 6 resin, "A1030", manufactured by Unitika Ltd., in which carbon black as a black pigment was previously mixed such that it was contained in an amount of 1.2% by mass in a composite material to be produced, was spread and laminated on the fabric to prepare a 64-layer laminated sheet (carbon fibers: 64 layers, nylon: 65 layers), followed by heat compression at 260° C. and 2 MPa for 20 minutes. There was thus prepared a composite material 2 having a volume fraction (Vf) of carbon fibers of 47% and a thickness of 2 mm. Since the carbon fibers were a fabric, the average fiber length was not measured. As a result of measurement of an area proportion of the carbon fibers in a topmost surface layer of the composite material 2, it was found to be 90%.

[Composite Material 3 and Composite Material 3-2]

A composite material 3 was prepared in the same manner as in the composite material 1, except that the addition amount of carbon black was changed to 0.3% by mass. As a result of measurement of an area proportion of the carbon fibers in a topmost surface layer of the composite material 3, it was found to be 50%. A composite material 3-2 in which the addition amount of carbon black was 0.05% by mass was also prepared.

[Composite Material 4]

A composite material 4 was prepared in the same manner as in the composite material 1, except that the resin used was changed to a polycarbonate, "PANLITE" (registered trademark) L1225WP, manufactured by Teijin Limited. As a result of measurement of an area proportion of the carbon fibers in a topmost surface layer of the composite material 4, it was found to be 50%. In Table 1, the polycarbonate is expressed as "PC".

[Composite Material 5]

A composite material 5 was prepared in the same manner as in the composite material 1, except that the composite material was prepared without adding the carbon black. As a result of measurement of an area proportion of the carbon fibers in a topmost surface layer of the composite material 5, it was found to be 50%.

[Composite Material 6]

A composite material 6 was prepared in the same manner as in the composite material 1, except that glass fibers, EX-2500 (average fiber diameter: 15 μm, fiber width: 9 mm), manufactured by Nippon Electric Glass Co., Ltd. was used as the fibers used and adjusted so as to have a glass fiber basis weight to 2,650 g/m$^2$ and a nylon resin basis weight to 1,500 g/m$^2$, respectively. A volume fraction (Vf) of the glass fibers was 44%. As a result of measurement of an area proportion of the carbon fibers in a topmost surface layer of the composite material 6, it was found to be 50%.

[Composite Materials 7, 8, and 9]

Composite materials 7, 8, and 9 were prepared in the same manner as in the composite material 1, except that the volume fraction of the carbon fibers was changed to 5%, 15%, and 70%, respectively. The area proportion of the carbon fibers in a topmost surface was 3%, 12%, and substantially 100%, respectively.

[Composite Materials 10 and 11]

Composite materials 10 and 11 were prepared in the same manner as in the composite material 1, except that the carbon fibers were cut by a rotary cutter so as to have an average fiber length of 5 mm and 40 mm, respectively.

[Composite Material 12]

A composite material 12 was prepared in the same manner as in the composite material 1, except that the black pigment used was changed to triiron tetraoxide, and its addition amount was adjusted to 0.3 wt %.

Example 1

Marking was applied with a YVO$_4$ laser having a wavelength of 1,064 nm on the above-prepared composite material 1, thereby obtaining a composite material marked with QR code (registered trademark) of about 15 mm in square. The QR code (registered trademark) was read by the above-described handy type scanner (BT-1000, manufactured by Keyence Corporation), and the marking properties were evaluated. The results are shown in Table 1. The table also presents "Output density (mW/μm$^2$)" and "Irradiation energy per pulse (×10$^5$ mWs)"

Example 2

A marked composite material was obtained by performing the same operations as in Example 1, except that YVO$_4$ (SHG) having a wavelength of 532 nm was used as the laser at an output of 1 (W). The results are shown in Table 1.

Example 3

A marked composite material was obtained by performing the same operations as in Example 2, except that the composite material 3 was used. The results are shown in Table 1.

Example 4

The same operations as in Example 1 were performed, except that the composite material 4 was used, followed by marking the composite material. The results are shown in Table 1.

Comparative Example 9

A marked composite material was obtained by performing the same operations as in Example 1, except that the composite material 2 was used. The results are shown in Table 1. However, in a certain specified region, continuous fibers concentratedly exist in the topmost surface layer due to scattering in view of production, and the area proportion of the topmost surface exceeds 90%, and therefore, in such a specified region, the marking cannot be applied. Then, the marking test was performed so as to avoid such a specified region. The results are shown in Table 1.

Reference Example 6, Examples 7 to 10

Reference Example 6, Examples 7 to 10, the same operations as in Example 2 were performed by using the composite materials 7 to 12, respectively, thereby obtaining marked composite materials. The results are shown in Table 2.

However, in Example 9, since the carbon fiber length was relatively long, a specified region where the fibers were slightly concentrated was existent, and a place where marking was hardly applied (place where the area proportion of carbon fibers in the topmost surface was high) was slightly formed.

Comparative Example 1

A marked composite material was obtained by performing the same operations as in Example 1, except that a $CO_2$ laser having a wavelength of 10,600 nm was used as the laser at an output of 20 (W). The results are shown in Table 1.

Comparative Example 2

A marked composite material was obtained by performing the same operations as in Example 1, except that the laser was used at an output of 100 (W). The results are shown in Table 1.

Comparative Example 3

A marked composite material was obtained by performing the same operations as in Comparative Example 1, except that the composite material 6 was used. The results are shown in Table 1.

Comparative Example 4

A marked composite material was obtained by performing the same operations as in Comparative Example 1, except that the composite material 5 was used. The results are shown in Table 1.

Comparative Example 5

A marked composite material was obtained by performing the same operations as in Comparative Example 4, except that the laser used in Comparative Example 4 was changed to $YVO_4$ laser having a wavelength of 1,064 nm at an output of 3 (W). The results are shown in Table 1.

Comparative Examples 6 and 7

The same operations as in Example 2 were performed by using the composite material 9 and the composite material 3-2, respectively, thereby obtaining marked composite materials. The results are shown in Table 2.

Comparative Example 8

A marked composite material was obtained by performing the same operations as in Example 5, except that the laser used was changed to a YAG laser (wavelength: 1,060 nm, output: 3). The results are shown in Table 2.

The resulting composite material was melted over a wide range exceeding the desired range, and the color could not be clearly developed.

Reference Examples

Reference Examples are hereunder described.

[Reference Molded Body 101]

A nylon 6 resin, "A1030", manufactured by Unitika Ltd. was used as a thermoplastic resin and uniformly mixed with 0.3% by mass of triiron tetraoxide and carbon fibers in a volume fraction (Vf) of 10% by using a Henschel mixer, and the mixture was pelletized using a small-sized extruder to obtain a resin composition. A molded body was produced from the resulting resin composition by means of injection molding, and this molded body was designated as a reference molded body 101.

An average fiber length of the carbon fibers contained in the reference composite material 101 was 0.2 mm, and an area proportion of the carbon fibers in the topmost surface was 40%. The average fiber length is one calculated in terms of a weight average fiber length (formula (4)) as described previously, and therefore, it is longer than the number average fiber length.

The reason why the area proportion of the carbon fibers in the topmost surface is high resides in the matter that since the resin is more likely contracted than the carbon fibers, the volume fraction (Vf) of the carbon fibers of the outside is liable to increase.

[Reference Molded Body 102]

A molded body was produced in the same manner as in the reference molded body 101, except that the carbon fibers were not used, and carbon black as a black pigment was added in an amount of 1.2% by mass, and this molded body was designated as a reference molded body 102.

[Reference Composite Material 103]

A composite material was prepared in the same manner as in the composite material 6, except that the carbon black was not contained, thereby obtaining a reference composite material 103.

Reference Examples 1 to 2

The reference molded body 101 was used and subjected to a marking test with a $YVO_4$ laser having a wavelength of 1,064 nm set at an output of 3 (W) and a $CO_2$ laser having a wavelength of 10,600 nm set at an output of 3 (W), respectively. As a result, there was no difference between the both.

Reference Examples 3 to 4

The reference molded body 102 was used and subjected to a marking test with a $YVO_4$ laser having a wavelength of 1,064 nm set at an output of 3 (W) and a $CO_2$ laser having a wavelength of 10, 600 nm set at an output of 3 (W), respectively. As a result, there was no substantial difference between the both.

Reference Example 5

A marked composite material was obtained by performing the same operations as in Comparative Example 5, except that the reference composite material 103 was used. The results are shown in Table 3.

In comparison with Comparative Example 5, in the case of using glass fibers, good evaluations were revealed even without using the carbon black.

In Examples 11 to 17, laser marking was applied in the same manner as in Example 1 except that the laser conditions are variously adjusted to conduct the experiment.

Similarly in Examples 10 to 12, laser marking was applied in the same manner as in Example 1 except that the laser conditions are variously adjusted to conduct the experiment.

The kinds of laser and the apparatuses used are shown in Table 4. The table also presents "Output density (mW/μm$^2$)" and "Irradiation energy per pulse (×10$^5$ mWs)" which were calculated from the output (W), spot diameter (μm), laser pulse frequency (Hz), and irradiation time per pulse (second).

It can be seen from the results in table 4 that, when the output density is 0.1 (mW/μm$^2$) or more, the composite material is successfully burned off. For example, in Comparative Examples 11 and 12, since the output density during laser irradiation was low, only a matrix of a surface layer was burned off without being able to form a minute recess.

It can further be seen that, when the irradiation energy per pulse is 90,000 (×10$^5$ mWs) or less, burning hardly spreads and marking is applied in an appropriate range. For example, in Comparative Example 10, the irradiation energy per pulse was 10,000,000 (×10$^5$ mWs), and therefore the composite material was melted over a wide range exceeding the desired range.

TABLE 1

|  |  | Example 1 | Example 2 | Example 3 | Example 4 | Comparative Example 9 |
|---|---|---|---|---|---|---|
| Composite material | Composite material | Composite material 1 | Composite material 1 | Composite material 3 | Composite material 4 | Composite material 2 |
|  | Area proportion of carbon fibers in topmost surface | 50% | 50% | 50% | 50% | 90% |
|  | Average fiber length | 16 mm | 16 mm | 16 mm | 16 mm | Continuous fibers |
|  | Volume fraction (Vf) of carbon fibers | 43% | 43% | 43% | 43% | 47% |
|  | Carbon black | 1.2 wt % | 1.2 wt % | 0.3 wt % | 1.2 wt % | 1.2 wt % |
|  | Resin | Nylon 6 | Nylon 6 | Nylon 6 | PC | Nylon 6 |
| Laser condition | Kind | YVO$_4$ | YVO$_4$ (SHG) | YVO$_4$ (SHG) | YVO$_4$ | YVO$_4$ |
|  | Wavelength (nm) | 1064 | 532 | 532 | 1064 | 1064 |
|  | Output (W) | 3 | 1 | 1 | 3 | 3 |
|  | Output density (mW/μm$^2$) | 4.2 | 6.4 | 6.4 | 4.2 | 4.2 |
|  | Irradiation energy per pulse (× 10$^5$ mWs) | 6,000 | 2,000 | 2,000 | 6,000 | 6,000 |
| Surface of composite material after irradiation with laser | Carbon fibers | Remained | Remained | Remained | Remained | Remained |
|  | Carbon black-resin portion | A minute recess was formed (FIG. 2) | A minute recess was formed (FIG. 2) | A minute recess was formed (FIG. 2) | A minute recess was formed (FIG. 2) | A minute recess was formed (FIG. 2) |
|  | Structural color | Color was developed | Color was developed | Color was developed | Color was developed | Color was developed |
| Recognition propriety | (Good) 5 to 1 (Poor) | 4 | 5 | 5 | 4 | 4 |

|  |  | Comparative Example 1 | Comparative Example 2 | Comparative Example 3 | Comparative Example 4 | Comparative Example 5 |
|---|---|---|---|---|---|---|
| Composite material | Composite material | Composite material 1 | Composite material 1 | Composite material 6 | Composite material 5 | Composite material 5 |
|  | Area proportion of carbon fibers in topmost surface | 50% | 50% | 50% (Area proportion of glass fibers in topmost surface) | 50% | 50% |
|  | Average fiber length | 16 mm | 16 mm | 16 mm | 16 mm | 16 mm |
|  | Volume fraction (Vf) of carbon fibers | 43% | 43% | 43.6% (Area fraction of glass fibers) | 43% | 43% |
|  | Carbon black | 1.2 wt % | 1.2 wt % | 1.2 wt % | 0 | 0 |
|  | Resin | Nylon 6 | Nylon 6 | Nylon 6 | Nylon 6 | Nylon 6 |
| Laser condition | Kind | CO$_2$ laser | CO$_2$ laser | CO$_2$ laser | CO$_2$ laser | YVO$_4$ |
|  | Wavelength (nm) | 10600 | 10600 | 10600 | 10600 | 1064 |
|  | Output (W) | 20 | 100 | 20 | 20 | 3 |
|  | Output density (mW/μm$^2$) | — | — | — | — | 4.2 |
|  | Irradiation energy per pulse (× 10$^5$ mWs) | — | — | — | — | 6,000 |
| Surface of composite material after irradiation with laser | Carbon fibers | Remained | Burned off | Part of glass fibers was semi-melted | Remained | Remained |
|  | Carbon black-resin portion | A minute recess could not be formed, but only matrix of the surface layer was burned off (FIG. 3) | Melted over a wide range exceeding the desired range | A minute recess could not be formed, but only matrix of the surface layer was burned off (FIG. 3) | A minute recess could not be formed, but only matrix of the surface layer was burned off (FIG. 3) | A minute recess could not be formed, but only matrix of the surface layer was burned off (FIG. 3) |
|  | Structural color | Color was not developed | Color was not developed | Color was not developed | Color was not developed | Color was not developed |
| Recognition propriety | (Good) 5 to 1 (Poor) | 2 | 1 | 3 | 1 | 2 |

TABLE 2

|  |  | Reference Example 6 | Example 7 | Example 8 | Example 9 | Example 10 | Comparative Example 6 | Comparative Example 7 | Comparative Example 8 |
|---|---|---|---|---|---|---|---|---|---|
| Composite material | Composite material | Composite material 7 | Composite material 8 | Composite material 10 | Composite material 11 | Composite material 12 | Composite material 9 | Composite material 3-2 | Composite material 2 |
|  | Area proportion of carbon fibers in topmost surface | 3% | 12% | 52% | 49% | 50% | Substantially 100% | 50% | 90% |
|  | Average fiber length | 16 mm | 16 mm | 5 mm | 40 mm | 16 mm | 16 mm | 16 mm | Continuous fibers |
|  | Volume fraction (Vf) of carbon fibers | 5% | 15% | 43% | 43% | 43% | 70% | 43% | 47% |
|  | Kind of black pigment | Carbon black | Carbon black | Carbon black | Carbon black | Triiron tetraoxide | Carbon black | Carbon black | Carbon black |
|  | Addition amount of black pigment | 1.2 wt % | 1.2 wt % | 1.2 wt % | 1.2 wt % | 0.3 wt % | 1.2 wt % | 0.05 wt % | 1.2 wt % |
|  | Resin | Nylon 6 | Nylon 6 | Nylon 6 | Nylon 6 | Nylon 6 | Nylon 6 | Nylon 6 | Nylon 6 |
| Laser condition | Kind | $YVO_4$ (SHG) | $YVO_4$ (SHG) | $YVO_4$ (SHG) | $YVO_4$ (SHG) | $YVO_4$ (SHG) | $YVO_4$ (SHG) | $YVO_4$ (SHG) | YAG laser |
|  | Wavelength (nm) | 532 | 532 | 532 | 532 | 532 | 532 | 532 | 1060 |
|  | Output (W) | 1 | 1 | 1 | 1 | 1 | 1 | 1 | 3 |
|  | Output density (mW/μm$^2$) | 6.4 | 6.4 | 6.4 | 6.4 | 6.4 | 6.4 | 6.4 | 5.2 |
|  | Irradiation energy per pulse (× 10$^5$ mWs) | 2,000 | 2,000 | 2,000 | 2,000 | 2,000 | 2,000 | 2,000 | 10,000,000 |
| Surface of composite material after irradiation with laser | Carbon fibers Carbon black-resin portion | Remained A minute recess was formed (FIG. 2) | Remained A minute recess was formed (FIG. 2) | Remained A minute recess was formed (FIG. 2) | Remained A minute recess was formed (FIG. 2) | Remained A minute recess was formed (FIG. 2) | Remained Because of an excess of carbon fibers on the surface, a minute recess could not be formed | Remained A minute recess could not be formed, but only matrix of the surface layer was burned off (FIG. 3) | Remained Melted over a wide range exceeding the desired range |
|  | Structural color | Color was developed | Color was developed | Color was developed | Color was developed | Color was developed | Color was not developed | Color was not developed | Color was not developed |
| Recognition propriety | (Good) 5 to 1 (Poor) | 5 | 5 | 5 | 4 | 4 | 1 | 2 | 1 |

TABLE 3

|  |  | Reference Example 1 | Reference Example 2 | Reference Example 3 | Reference Example 4 | Reference Example 5 |
|---|---|---|---|---|---|---|
| Composite material | Composite material | Reference molded body 101 | Reference molded body 101 | Reference molded body 102 | Reference molded body 102 | Reference molded body 103 |
|  | Area proportion of carbon fibers in topmost surface | 40% | 40% | 0% | 0% | 50% (Area proportion of glass fibers in topmost surface) |
|  | Average fiber length | 0.2 mm | 0.2 mm | — | — | 16 mm |
|  | Volume fraction (Vf) of carbon fibers | 10% | 10% | 0% | 0% | 43.6% (Area fraction of glass fibers) |
|  | Kind of black pigment | Triiron tetraoxide | Triiron tetraoxide | Carbon black | Carbon black | — |
|  | Addition amount of black pigment | 0.3 wt % | 0.3 wt % | 1.2 wt % | 1.2 wt % | — |
|  | Resin | Nylon 6 | Nylon 6 | Nylon 6 | Nylon 6 | Nylon 6 |
| Laser condition | Kind | $YVO_4$ | $CO_2$ laser | $YVO_4$ | $CO_2$ laser | $YVO_4$ |
|  | Wavelength (nm) | 1064 | 10600 | 1064 | 10600 | 1064 |
|  | Output (W) | 3 | 20 | 3 | 20 | 3 |
| Surface of composite material | Carbon fibers Carbon black-resin | Remained A minute recess was formed | Remained A minute recess was formed | — A minute recess was formed | — A minute recess was formed | Remained A minute recess was formed |

TABLE 3-continued

|  |  | Reference Example 1 | Reference Example 2 | Reference Example 3 | Reference Example 4 | Reference Example 5 |
|---|---|---|---|---|---|---|
| after irradiation with laser | portion Structural color | (FIG. 2) Color was developed | (FIG. 2) Color was developed | (FIG. 2) Color was developed | (FIG. 2) Color was developed | (FIG. 2) Color was developed |
| Recognition propriety | (Good) 5 to 1 (Poor) | 4 | 4 | 5 | 4 | 4 |

TABLE 4

|  |  | Example 11 | Example 12 | Example 13 | Example 14 | Example 15 |
|---|---|---|---|---|---|---|
| Composite material | Composite material | Composite material 1 | Composite material 1 | Composite material 1 | Composite material 1 | Composite material 1 |
|  | Area proportion of carbon fibers in topmost surface | 50% | 50% | 50% | 50% | 50% |
|  | Average fiber length | 16 mm | 16 mm | 16 mm | 16 mm | 16 mm |
|  | Volume fraction (Vf) of carbon fibers | 43% | 43% | 43% | 43% | 43% |
|  | Carbon black | 1.2 wt % | 1.2 wt % | 1.2 wt % | 1.2 wt % | 1.2 wt % |
|  | Resin | Nylon 6 | Nylon 6 | Nylon 6 | Nylon 6 | Nylon 6 |
| Laser condition | Kind | $YVO_4$ | $YVO_4$ | $YVO_4$ | $YVO_4$ | $YVO_4$ |
|  | Manufacturer | Keyence | Keyence | MIYACHI | MIYACHI | Rocky Mountain |
|  | Apparatus | MD-V9900 | MD-T1000 | ML-7110A | ML-9001A | RMI-U-10 |
|  | Wavelength (nm) | 1064 | 532 | 1064 | 532 | 1064 |
|  | Output (W) | 3 | 1 | 3 | 1 | 3 |
|  | Spot diameter (μm) | 60 | 20 | 40 | 30 | 50 |
|  | Laser pulse frequency (Hz) | 50,000 | 50,000 | 50,000 | 50,000 | 50,000 |
|  | Irradiation time per pulse (second) | 0.000005 | 0.00001 | 0.000005 | 0.000005 | 0.000005 |
|  | Output density (mW/μm$^2$) | 4.2 | 6.4 | 9.5 | 5.7 | 6.1 |
|  | Irradiation energy per pulse (× 10$^5$ mWs) | 6,000 | 2,000 | 6,000 | 2,000 | 6,000 |
| Surface of composite material after irradiation with laser | Carbon black-resin portion | Color was developed | Color was developed | Color was developed | Color was developed | Color was developed |
| Recognition propriety | (Good) 5 to 1 (Poor) | 4 | 5 | 4 | 5 | 4 |

|  |  | Example 16 | Comp. Ex. 10 | Comp. Ex. 11 | Comp. Ex. 12 |
|---|---|---|---|---|---|
| Composite material | Composite material | Composite material 1 | Composite material 1 | Composite material 1 | Composite material 1 |
|  | Area proportion of carbon fibers in topmost surface | 50% | 50% | 50% | 50% |
|  | Average fiber length | 16 mm | 16 mm | 16 mm | 16 mm |
|  | Volume fraction (Vf) of carbon fibers | 43% | 43% | 43% | 43% |
|  | Carbon black | 1.2 wt % | 1.2 wt % | 1.2 wt % | 1.2 wt % |
|  | Resin | Nylon 6 | Nylon 6 | Nylon 6 | Nylon 6 |
| Laser condition | Kind | $YVO_4$ | YAG | YAG | YAG |
|  | Manufacturer | Rocky Mountain | MIYACHI | Rocky Mountain | Rocky Mountain |
|  | Apparatus | RMI-U-5G | ML-2150A | RMI-UM-1 | LD-excited YAG |
|  | Wavelength (nm) | 532 | 1064 | 1064 | 1064 |
|  | Output (W) | 2 | 3 | 2 | 2 |
|  | Spot diameter (μm) | 30 | 70 | 70 | 80 |
|  | Laser pulse frequency (Hz) | 50,000 | 30 | 2000 | 2000 |
|  | Irradiation time per pulse (second) | 0.000005 | 0.005 | 0.005 | 0.005 |
|  | Output density (mW/μm$^2$) | 11.3 | 5.2 | 0.052 | 0.040 |
|  | Irradiation energy per pulse (× 10$^5$ mWs) | 4,000 | 10,000,000 | 100,000 | 100,000 |
| Surface of composite material after irradiation with laser | Carbon black-resin portion | Color was developed | Melted over wide range exceeding the desired range | Only matrix of surface layer was burned off without being capable of forming minute recess | Only matrix of surface layer was burned off without being capable of forming minute recess |
| Recognition propriety | (Good) 5 to 1 (Poor) | 5 | 1 | 3 | 3 |

INDUSTRIAL APPLICABILITY

The marked composite material of the present invention is adaptable to various products and can be particularly suitably used for, for example, casings of electrical and electric equipment, or automotive applications, or the like. In particular, the marked composite material of the present invention can be suitably used for mass production applications including a large number of manufacturing processes, represented by automobiles and consumer electrical applications.

REFERENCE SIGNS LIST

1: Composite material
2: Marked recess
3: Carbon fibers

The invention claimed is:

1. A method of applying laser marking on a composite material comprising a black pigment, carbon fibers, and a resin, and having the following 1) to 3):
   1) an area proportion of the carbon fibers in a topmost surface layer of the material from 10 to 90%,
   2) a proportion of the black pigment contained in the composite material from 0.2 to 20% by mass, and
   3) an average fiber length of the carbon fibers from 1 to 100 mm,
   wherein the laser marking is applied using a $YVO_4$ laser having a wavelength from 100 to 2,000 nm, an output density from 1.0 (mW/$\mu m^2$) to 30 (mW/$\mu m^2$), and an irradiation energy per pulse from $1000 \times 10^{-5}$ (mWs) to $50,000 \times 10^{-5}$ (mWs).

2. The method of applying laser marking according to claim 1, wherein the wavelength is 300 to 600 nm.

3. The method of applying laser marking according to claim 1, wherein the area proportion of the carbon fibers in the topmost surface layer is 20 to 60%.

4. The method of applying laser marking according to claim 1, wherein the resin contained in the composite material is a thermoplastic resin.

5. The method of applying laser marking according to claim 1, wherein a volume fraction (Vf) of the carbon fibers contained in the composite material is 10 to 65%.

6. The method of applying laser marking according to claim 1, wherein the black pigment is carbon black.

7. The method of applying laser marking according to claim 1, wherein the laser marking is applied using a laser having an output density from 3.0 (mW/$\mu m^2$) to 20 (mW/$\mu m^2$).

8. The method of applying laser marking according to claim 1, wherein the wavelength is 1,000 to 1,200 nm.

9. The method of applying laser marking according to claim 1, wherein the irradiation energy per pulse is from $1500 \times 10^{-5}$ (mWs) to $10,000 \times 10^{-5}$ (mWs).

10. The method of applying laser marking according to claim 1, wherein the laser marking is applied using a laser beam having a beam diameter from 10 to 40 $\mu$m.

11. A method of producing a composite material having laser marking applied thereon by using the method of applying laser marking set forth in claim 1.

12. The method of producing a composite material according to claim 11, wherein the wavelength is 300 to 600 nm.

13. The method of producing a composite material according to claim 11, wherein the area proportion of the carbon fibers in the topmost surface layer is 20 to 60%.

14. The method of producing a composite material according to claim 11, wherein the resin contained in the composite material is a thermoplastic resin.

15. The method of producing a composite material according to claim 11, wherein a volume fraction (Vf) of the carbon fibers contained in the composite material is 10 to 65%.

16. The method of producing a composite material according to claim 11, wherein the black pigment is carbon black.

17. The method of producing a composite material according to claim 11, wherein the wavelength is 1,000 to 1,200 nm.

* * * * *